US 6,677,417 B2

(12) United States Patent
Meffert et al.

(10) Patent No.: US 6,677,417 B2
(45) Date of Patent: Jan. 13, 2004

(54) METHOD FOR ADJUSTING THE PARTICLE SIZE OF POPCORN POLYMERS DURING POPCORN POLYMERIZATION

(75) Inventors: Helmut Meffert, Ludwigshafen (DE); Werner Bertleff, Viernheim (DE); Michael Kerber, Weinheim (DE); Peter Spang, St Ingbert (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/220,278

(22) PCT Filed: Mar. 6, 2001

(86) PCT No.: PCT/EP01/02490
§ 371 (c)(1),
(2), (4) Date: Sep. 9, 2002

(87) PCT Pub. No.: WO01/68727
PCT Pub. Date: Sep. 20, 2001

(65) Prior Publication Data
US 2003/0125491 A1 Jul. 3, 2003

(30) Foreign Application Priority Data
Mar. 10, 2000 (DE) ............................................ 100 11 137

(51) Int. Cl.[7] .................................................. C08F 26/08
(52) U.S. Cl. ....................... 526/264; 526/302; 526/336; 524/808
(58) Field of Search ................................. 526/264, 302, 526/336; 524/808

(56) References Cited

U.S. PATENT DOCUMENTS

| 3,277,066 A | | 10/1966 | Grosser et al. | |
| 4,451,582 A | | 5/1984 | Denzinger et al. | |
| 4,647,637 A | * | 3/1987 | Tschang et al. | ............. 526/264 |
| 4,956,430 A | | 9/1990 | Tazi | |
| 5,599,898 A | | 2/1997 | Hartmann et al. | |
| 6,133,392 A | * | 10/2000 | Utecht et al. | ................ 526/312 |
| 6,525,156 B1 | * | 2/2003 | Ernst et al. | .................. 526/347 |
| 2002/0153331 A1 | * | 10/2002 | Gomez et al. | .............. 210/777 |
| 2003/0032574 A1 | * | 2/2003 | Meffert et al. | ............... 510/466 |

FOREIGN PATENT DOCUMENTS

| DE | 2 059 484 | | 6/1972 |
| DE | 2 255 263 | | 5/1974 |
| EP | 0 175 335 | | 3/1986 |
| EP | 0 177 812 | | 11/1989 |
| EP | 0 508 358 | | 10/1992 |
| WO | 94/11408 | | 5/1994 |
| WO | WO 00/68286 | * | 11/2000 |

OTHER PUBLICATIONS

Ullmanns Encyklopaedie Der Technischen Chemie 4th Edition, vol. 19 1980.
H. Bartl et al. Makromolekulare Stoffe, Houban–Weyl, vol. 14, part 1, p. 98 1961.
J.W. Breitenbach et al.: "Acrylsaeur–popcornpolymere, 2" Makromol. Chem., 177, pp. 2787–2792 1976.

* cited by examiner

Primary Examiner—Helen L. Pezzuto
(74) Attorney, Agent, or Firm—Oblon, Spivak, McClelland, Maier & Neustadt, P.C.

(57) ABSTRACT

The particle size of popcorn polymers is established during the popcorn polymerization by a process in which reaction mixtures forming popcorn polymers and comprising monoethylenically unsaturated monomers and a crosslinking agent are polymerized in the absence of oxygen and polymerization initiators at up to 200° C. and in which the popcorn polymerization is carried out as a precipitation polymerization in water or in the absence of a solvent and the particle size of the popcorn polymers is controlled in the range from 1 μm to 10 mm by passing an inert gas stream into the reaction mixture, and popcorn polymers having a mean particle diameter of from >400 μm to 1500 μm are used as beverage clarifiers, antidiarrheal drugs and disintegration accelerators for tablets.

14 Claims, No Drawings

METHOD FOR ADJUSTING THE PARTICLE SIZE OF POPCORN POLYMERS DURING POPCORN POLYMERIZATION

The present invention relates to a process for establishing the particle size of popcorn polymers during popcorn polymerization, reaction mixtures forming popcorn polymers and comprising monoethylenically unsaturated monomers and a crosslinking agent being polymerized in the absence of oxygen and polymerization initiators at up to 200° C.

It is known that the homopolymers of N-vinylpyrrolidone are generally readily soluble in water and in numerous organic solvents. Furthermore, it is known that insoluble, more or less swellable copolymers based on N-vinylpyrrolidone can be prepared by incorporating at least bifunctional vinyl or acryloyl compounds, which act as crosslinking agents, as polymerized units in a conventional manner. However, even when relatively large amounts of bifunctional components are used, it is not possible to prepare polymers having only low swellability and controllable particle size in water. Polymers based on N-vinylpyrrolidone and having low swellability are prepared, for example, by popcorn polymerization, cf. for example DE-A-2059484, DE-A-2255263 and U.S. Pat. No. 3,277,066.

U.S. Pat. No. 4,451,582 discloses a process for the preparation of insoluble, granular polymers which are only slightly swellable in water and comprise basic vinyl heterocycles having a pKa value of more than 4 and their copolymers with up to 30% by weight of copolymerizable monomers, in which the monomers are polymerized in the presence of from 0.1 to 10% by weight, based on the total amount of monomers, of crosslinking agent in the absence of oxygen and polymerization initiators. The polymers are preferably prepared by precipitation polymerization in water. However, they can also be obtained in the absence of solvents for the monomers, by heating the monomers to temperatures of preferably from 150 to 180° C. This reaction is however poorly controllable and gives only low space-time yields and relatively highly contaminated products.

It is also known that insoluble, only slightly swellable polymers of acrylic acid can be prepared by polymerizing acrylic acid in aqueous solution in the presence of small amounts of 2,2'-azobisisobutyronitrile, cf. J. W. Breitenbach et al., Makromol. Chemie 177, (1976), 2787 to 2792. However, this gives polymer blends which contain a glassy polymer (gel) as the main component and popcorn polymers of acrylic acid in minor amounts. The separation of the polymer blends cannot be carried out at an acceptable cost in industry.

Houben-Weyl, Volume 14, Makrom. Stoffe, Part 1 (1961), page 98, discloses that popcorn polymers are formed from mixtures of styrene with divinylbenzene. Popcorn polymers also form in the industrial butadiene/styrene polymerization. Methyl acrylate, too, tends to form popcorn polymers. On contact with the monomers of which they consist or with other monomers, popcorn polymers have the property of being able to convert them into popcorn polymers. They act as a nucleus for the polymerization. However, the activity is lost if they come into contact with oxygen.

Ullmanns Encyklopädie der Techn. Chemie, 4$^{th}$ Edition, Volume 19, 1980, page 385, discloses that an insoluble polymer slightly swellable in water is formed on heating N-vinylpyrrolidone with hydroxides and alcoholates of alkali metals and alkaline earth metals. Such substances referred to as popcorn polymers also form on heating N-vinylpyrrolidone with divinyl compounds in the absence of oxygen and polymerization initiators. In the absence of bases as a rule several hours are required before the popcorn polymerization begins at all.

EP-B-0 177 812 discloses a process for the preparation of insoluble, only slightly swellable, polymer powders based on monoethylenically unsaturated carboxamides, carboxylic acids and carboxylic esters, in which the polymerization is initiated using an active popcorn polymer which is obtainable by heating a mixture of from 99.6 to 98.8% by weight of N-vinylpyrrolid-2-one and from 0.4 to 1.2% by weight of a compound having at least two ethylenically unsaturated double bonds, as a crosslinking agent, to a temperature of from 100 to 150° C. in the absence of oxygen and polymerization initiators. As soon as the active popcorn polymer has formed, a mixture of a) from 99.9 to 90% by weight of at least one compound from the group consisting of the N-vinylcarboxamides, acrylamide, methacrylamide, acrylic acid, methacrylic acid, acrylic esters, methacrylic esters and/or vinyl esters and b) from 0.1 to 10% by weight, based on the total monomers, of a compound having at least two ethylenically unsaturated double bonds, as a crosslinking agent, is polymerized therein in a powder bed in the presence of a heat transfer agent which is inert to the reactants, at from 90 to 220° C. while maintaining the powder state, circulating the reaction material and evaporating the heat transfer agent from the polymerization zone, in the absence of oxygen and polymerization initiators. The popcorn polymers thus obtainable are used, for example, for absorbing tannins from beverages, as dissolution accelerators for pharmaceutical tablets and as ion exchangers. Carboxyl-containing popcorn polymers are obtained, for example, by hydrolyzing popcorn polymers containing acrylic ester and acrylamide units.

WO-A-94/11408 discloses insoluble, only slightly swellable polymers having amino groups. These polymers are prepared by polymerizing open-chain N-vinylcarboxamides, such as N-vinylformamide, and, if required, other monomers copolymerizable therewith with from 0.1 to 10% by weight, based on the monomers used in the polymerization, of a compound having at least two ethylenically unsaturated double bonds, as a crosslinking agent, in the absence of oxygen and polymerization initiators to give popcorn polymers and eliminating the formyl or acyl group from at least 2% of the N-vinylcarboxamides incorporated as polymerized units, with formation of amino-containing popcorn polymers, by the action of enzymes, bases or acids. The popcorn polymers are used as ion exchangers or as adsorber resin for metal ions.

The disadvantage of said processes for the preparation of popcorn polymers is that any desired particle size of the polymer material is formed more or less accidentally and can be brought to the particle size required for the particular application only in an inconvenient manner by mechanical comminution or by agglomeration. However, it is essential to establish the particle size for many applications.

It is an object of the present invention to provide a process for establishing the particle size of popcorn polymers during the popcorn polymerization.

We have found that this object is achieved, according to the invention, by a process for establishing the particle size of popcorn polymers during the popcorn polymerization, reaction mixtures forming popcorn polymers and comprising monoethylenically unsaturated monomers and a crosslinking agent being polymerized in the absence of oxygen and polymerization initiators at up to 200° C., if the popcorn polymerization is carried out as a precipitation polymerization in water or in the absence of a solvent and the particle size of the popcorn polymers is controlled in the range from 1 μm to 10 mm by passing an inert gas stream into the reaction mixture. For example, from 0.01 to 100, preferably from 0.05 to 30, in particular from 0.1 to 20, liters of inert gas per hour per liter of reaction mixture are required for this purpose.

For the preparation of popcorn polymers, for example,
a) N-vinyllactams of the formula

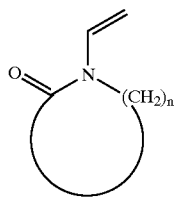

(I)

where n is 3-5, and, if required,
b) other monoethylenically unsaturated monomers copolymerizable therewith
are polymerized in the presence of
c) from 0.1 to 10% by weight, based on the monomers a) and b) used in the polymerization, of a compound containing at least two ethylenically unsaturated double bonds, as a crosslinking agent, in the absence of polymerization initiators and oxygen to give popcorn polymers.

Suitable compounds of the formula I are, for example, N-vinylpyrrolidone, N-vinylpiperidone and N-vinylcaprolactam. In 30 the polymerization, it is also possible to use mixtures of the monomers of group (a), for example mixtures of N-vinylpyrrolidone and N-vinylcaprolactam.

The monomers of group (b), which, if required, is present in the preparation of the popcorn polymers, are other monoethylenically unsaturated compounds copolymerizable with the monomers of groups (a) and (c). These include, for example, acrylamide, methacrylamide, acrylic acid, methacrylic acid, acrylic esters, methacrylic esters and/or vinyl esters. The acrylic and methacrylic esters are preferably derived from saturated, monohydric alcohols of 1 to 4 carbon atoms and saturated dihydric alcohols of 2 to 4 carbon atoms, respectively. Examples of these esters are methyl acrylate, methyl methacrylate, ethyl acrylate, ethyl methacrylate, n-propyl acrylate, n-propyl methacrylate, isopropyl acrylate, isopropyl methacrylate and the esters of acrylic acid and methacrylic acid which are derived from the isomeric butanols, and hydroxyethyl acrylate, hydroxyethyl methacrylate, hydroxypropyl acrylate, hydroxypropyl methacrylate, hydroxybutyl acrylate, hydroxyisobutyl acrylate and hydroxyisobutyl methacrylate. Among the vinyl esters, vinyl acetate and vinyl propionate are preferred. Further suitable monomers of group (b) are styrene, p-tert-butylstyrene, acrylonitrile, methacrylonitrile, N-vinylformamide, N-vinyl-N-methylformamide, N-vinylacetamide, N-vinyl-N-methylacetamide, N-vinyl-N-ethylformamide, N-vinyl-N-(n-propyl)formamide, N-vinyl-N-isopropylformamide, N-vinyl-N-isobutylformamide, N-vinyl-N-methylpropionamide, N-vinyl-n-butylacetamide and N-vinyl-N-methylpropionamide, 1-vinylimidazole, 2-methyl-1-vinylimidazole and 4-methyl-1-vinylimidazole.

The monomers of group (b), singly or as a mixture with one another, can be polymerized together with the monomers of groups (a) and (c). The popcorn polymerization can be initiated, for example, by heating N-vinylpyrrolidone and small amounts, for example from 0.4 to 1.2% by weight, of a crosslinking agent, such as N,N'-divinylethyleneurea, in an aqueous medium in the presence of an alkali. Freshly distilled N-vinylpyrrolidone is preferably used for initiating the popcorn polymerization.

The popcorn polymerization takes place particularly readily with N-vinylpyrrolidone at from about 60 to 150° C. in the absence of oxygen and polymerization initiators.

If they are concomitantly used in the preparation of the popcorn polymers, the monomers of group (b) are present in an amount of 30 from 0.1 to 99.9% by weight in the monomer mixture comprising (a) and (b).

Compounds which contain at least two ethylenically unsaturated double bonds in the molecule are used as monomers of group (c), as crosslinking agents, in the polymerization. For example, alkylenebisacrylamides, such as methylenebisacrylamide, and N,N'-acryloylethylenediamine, N,N'-divinylethyleneurea, N,N'-divinylpropyleneurea, ethylidenebis-3-(N-vinylpyrrolidone), N,N'-divinyl-2,2'-diimidazolylbutane and 1,1'-bis-(3,3'-vinylbenzimidazolyl-2-one)-1,4-butane, are particularly suitable. Other suitable crosslinking agents are, for example, alkylene glycol di(meth)acrylates, such as ethylene glycol diacrylate, ethylene glycol dimethacrylate, tetraethylene glycol acrylate, tetraethylene glycol dimethacrylate, diethylene glycol acrylate and diethylene glycol methacrylate, aromatic divinyl compounds, such as divinylbenzene and divinyltoluene, and vinyl acrylate, allyl acrylate, allyl methacrylate, divinyldioxane, pentaerythrityl triallyl ether and mixtures of the crosslinking agents. The crosslinking agents are used in amounts of from 0.1 to 10, preferably from 1 to 4, % by weight, based on the monomers (a) and (b) used in the polymerization.

The popcorn polymerization is carried out by known methods, for example as precipitation polymerization or by mass polymerization. For example, a procedure is known in which—as described in EP-B-0 177 812—the popcorn polymerization is initiated by heating a mixture of from 99.6 to 98.8% by weight of N-vinylpyrrolidone and from 0.4 to 1.2% by weight of a compound having at least two ethylenically unsaturated double bonds, as a crosslinking agent, to a temperature of from 100 to 150° C. in the absence of oxygen and polymerization initiators. This polymerization is preferably initiated by the presence of small amounts of sodium hydroxide solution or potassium hydroxide solution. Within a short time, a polymerizable popcorn polymer forms and, on addition of suitable other monomer mixtures, i.e. the monomers of group (a) and, if required, (b) and further addition of the monomers (c), initiates and completes the popcorn polymerization of these monomers without an induction period, according to the invention an inert gas stream preferably being passed, before the beginning of the popcorn polymerization, into the monomers initially taken in the polymerization vessel, for controlling the particle size of the resulting popcorn polymers. However, the introduction of the inert gas stream is begun during the induction period of the polymerization at the latest, the inert gas stream being passed through the reaction mixture during the total duration of the popcorn polymerization.

To carry out the popcorn polymerization without a solvent, i.e. as a mass polymerization, the monomer mixture comprising (a) and (c) and, if required, (b) is rendered inert by passing in nitrogen and is then heated to a temperature of from 100 to 200° C., preferably from 150 to 180° C. It is advantageous furthermore to pass a gentle stream of nitrogen through the monomers also during the polymerization. The exclusion of oxygen is also achieved by polymerizing the batch at a pressure which is below atmospheric pressure and at which the monomers boil. However, the popcorn polymerization can be carried out under reduced pressure and while simultaneously passing in an inert gas. Depending on the type of monomers used and on the chosen temperature, the mixture is polymerized in the course of from 1 to 20 hours. For example, in the polymerization of N-vinylcarboxamides with 2% by weight of N,N'-divinylethyleneurea at 150° C. while stirring with a powerful stirrer and at 310 mbar and with the introduction of nitrogen, the first polymer particles form after 2.5 hours and their amounts slowly increase until the reaction mixture consists of a powder after a polymerization time of 10 hours. The popcorn polymer is obtained therefrom in yields of more than 90% in the form of a powder having an average particle size of from about 10 $\mu$m to 5 mm, preferably from more than 400 $\mu$m to 1000 $\mu$m.

For the preparation of the popcorn polymers, however, the precipitation polymerization in water is preferred. The concentration of the monomers is expediently chosen so that the reaction mixture can be thoroughly stirred over the total reaction time. If the concentration of the monomers in water is too high, e.g. 95% by weight, the polymer particles become tacky, so that stirring becomes more difficult than in more dilute aqueous solution. To carry out the reaction in the conventional stirred kettles, for example, monomer concentrations of from about 5 to 30, preferably from 10 to 20, % by weight, based on the aqueous mixture, are chosen. If more powerful stirrers are available, the monomer concentration of the aqueous solution can also be increased to 50% by weight, if required even higher. In some cases, it may be expedient to begin the popcorn polymerization with a relatively concentrated solution and then to add water for dilution in the course of the reaction.

The popcorn polymerization is preferably carried out at a pH above 6, in order to avoid possible hydrolysis of the monomers. The pH can be established by adding small amounts of bases, such as sodium hydroxide or ammonia, or of the conventional buffer salts, such as sodium carbonate, sodium bicarbonate or sodium phosphate. If required, the exclusion of oxygen can be achieved by heating the mixture to be polymerized to the boil and additionally passing an inert gas stream through the reaction mixture for controlling the particle size of the popcorn polymers.

The particle size of the popcorn polymers is controlled by the amount of the inert gas stream which is passed through the polymerization solution. If a little inert gas is fed to the reaction batch, as a rule coarse popcorn polymers form; if a large amount of inert gas flows through the polymerization solution, finer popcorn polymers form. Depending on various boundary conditions, for example kettle size, temperature and pressure, it is not possible to state exact conditions for establishing a specific particle size of the popcorn polymers for the respective individual case. The correct amount of inert gas for the individual case, which has to be passed through the reaction mixture, can be readily determined by a few simple experiments. As stated above, the amounts of inert gas which are to be passed through the reaction mixture are from 0.01 to 100, preferably from 0.05 to 30, l of inert gas per 1 of reaction mixture per h.

The inert gas used may be a noble gas, such as helium, neon or argon. Carbon dioxide is also suitable. Nitrogen is preferably used.

In some cases, it may also be advantageous to add small amounts—e.g. from 0.1 to 1% by weight, based on the monomer mixture—of a reducing agent, such as sodium sulfite, sodium pyrosulfite, sodium dithionite, ascorbic acid or mixtures of the reducing agents, to the reaction mixture for complete removal of dissolved oxygen.

The polymerization temperature may be varied within a wide range, for example from about 20 to 200° C., preferably from 50 to 150° C.

In a particularly preferred embodiment of the precipitation polymerization, a water-soluble comonomer, some of the crosslinking agent, water and, if required, a buffer and a reducing agent are heated in an inert gas stream until the first polymer particles appear. Then—if desired—a mixture rendered inert beforehand by blowing in nitrogen and comprising one or more of the abovementioned comonomers and the remaining crosslinking agent and, if required, water as a diluent is added in the course of from 0.2 to 5 hours. This procedure has the advantage that the popcorn polymerization takes only a short time.

The popcorn polymers can be isolated from the aqueous solution, purified and then—if the monomers incorporated as polymerized units contain hydrolyzable groups, e.g. monomers such as vinylformamide or methyl methacrylate—hydrolyzed. However, it is also possible to hydrolyze the aqueous suspension of the popcorn polymers directly.

The popcorn polymers are usually obtained in a yield of from about 90 to >99% of the theoretical yield. They can be isolated from the aqueous suspension by filtration or centrifuging with subsequent washing out with water and drying in conventional dryers, such as a through-circulation dryer, a vacuum dryer, a paddle dryer, a tumbler dryer, a fluidized-bed dryer or a pneumatic dryer. The popcorn polymers are virtually insoluble in water and all solvents and swell only slightly therein. The mean particle diameter of the dried popcorn polymers is usually from 1 $\mu$m to 10 mm. For the preparation of popcorn polymers, N-vinylpyrrolidone, N-vinylpiperidone, N-vinylcaprolactam or a mixture thereof is preferably used as monomers forming popcorn polymers. The preferably used crosslinking agent is N,N'-divinylethyleneurea.

Popcorn polymers having a mean particle diameter of from >400 $\mu$M to 1500 $\mu$m are used, for example, as beverage clarifiers, antidiarrheal drugs and disintegration accelerators for tablets.

Of particular interest is the use of popcorn polymers having a mean particle diameter of from 420 to 1000 $\mu$m in an amount of from 0.5 to 20% by weight in detergent and cleaning agent tablets for increasing the disintegration rate of the tablets on combination with water.

In the examples which follow, percentages are by weight. The particle size distribution of the popcorn polymers was determined by sieve analysis.

EXAMPLES

Comparative Example 1

1375 g of distilled water, 115 g of N-vinylpyrrolidone, 2.6 g of N,N'-divinylethyleneurea and 0.05 g of sodium hydroxide were initially taken in a stirred apparatus and heated to 60° C. while stirring at 60 rpm under a stream of nitrogen, which however was passed not through the reaction mixture but only above it. As soon as this temperature had been reached, 130 mg of sodium dithionite were added. The mixture was kept at 60° C. The popcorn polymerization took place very slowly and was complete after about 24 hours. The viscous suspension was filtered and the residue was washed with water (about 2000 ml) in order to remove impurities, such as soluble polymer and unpolymerized monomers. The yield of popcorn polymer was 100%.
Sieve Analysis:

| Particle size [μm] | Fraction [%] |
|---|---|
| >500 | 97.6 |
| 250–500 | 2.4 |
| <250 | 0 |

The comparative example was repeated twice. In each case, the particle size distribution of the popcorn polymers obtained was determined. The results are shown in the table below:

| Comparative Example Particle size [μm] | 2 Fraction [%] | 3 [%] |
|---|---|---|
| >500 | 80.5 | 71.2 |
| 250–500 | 14.9 | 19.5 |
| <250 | 4.6 | 9.3 |

The comparative examples show that the particle size of the popcorn polymers according to the prior art was not reproducible.

Example 1a 1375 g of distilled water, 115 g of N-vinylpyrrolidone, 2.6 g of N,N'-divinylethyleneurea and 0.05 g of sodium hydroxide were initially taken in a stirred apparatus and heated to 60° C. while stirring at a speed of 60 rpm. Nitrogen, which was fed into the reaction mixture with the aid of a tube which extended to the bottom of the stirred apparatus, flowed through the solution as early as during the heating-up period until completion of the polymerization. The flow rate was 6 l/h. After the temperature of the reaction mixture had reached 60° C., 130 mg of sodium dithionite were added. The mixture was kept at 60° C. The popcorn polymerization began after about 20 minutes and was complete after 5 hours. The viscous suspension was then filtered and the residue was washed with water (about 2000 ml) in order to remove impurities such as soluble polymer and residual monomers. The yield of popcorn polymer was 97%.

Example 1b

Example 1a was repeated exactly. The particle size distribution was determined. It is shown in the table below. As can be seen there, the particle distribution of the popcorn polymers differs only slightly from that of Example 1a. In contrast with the prior art processes, the results are reproducible.
Sieve Analysis:

| Example 1 Particle size [mm] | a) Fraction [%] | b) Fraction [%] |
|---|---|---|
| >500 | 72.0 | 74.3 |
| 250–500 | 13.6 | 15.5 |
| <250 | 14.4 | 10.2 |

Example 2

1375 g of distilled water, 115 g of N-vinylpyrrolidone, 2.6 g of N,N'-divinylethyleneurea and 0.05 g of sodium hydroxide were initially taken in a stirred apparatus and heated to 60° C. while stirring at a speed of 60 rpm. Nitrogen was passed from below into the reaction mixture and flowed through the solution during heating-up to the end of the reaction. The flow rate was 18 l/h. After the reaction mixture had reached 60° C., 26 mg of sodium dithionite were added. The mixture was kept at 60° C. The popcorn polymerization began after about 20 minutes and was complete after 5.5 hours. The viscous suspension was filtered and the residue was washed with water (about 2000 ml) in order to remove impurities such as soluble polymer and residual monomers. The yield of popcorn polymer was 100%.
Sieve Analysis:

| Particle size [μm] | Fraction [%] |
|---|---|
| >500 | 79.1 |
| 250–500 | 15.3 |
| <250 | 5.6 |

Example 3

1375 g of distilled water, 115 g of N-vinylpyrrolidone, 2.6 g of N,N'-divinylethyleneurea and 0.05 g of sodium hydroxide were initially taken in a stirred apparatus and heated to 60° C. while stirring at a speed of 60 rpm. Nitrogen flowed through the solution during the heating-up and the polymerization. The nitrogen was passed into the reaction mixture with the aid of a tube which extended to the bottom of the stirred apparatus. The flow rate was 6 l/h. After the reaction mixture had reached 60° C., 26 mg of sodium dithionite were added. The mixture was kept at 60° C. and stirred continuously. The popcorn polymerization began after about 20 minutes and was complete after about 6 hours. The viscous suspension was filtered and the residue was washed with water (about 2000 ml) in order to remove impurities such as soluble polymer and residual monomers. The yield of popcorn 40 polymer was 99%.
Sieve Analysis:

| Particle size [μm] | Fraction [%] |
|---|---|
| >500 | 94.8 |
| 250–500 | 13.0 |
| <250 | 9.2 |

Example 4

1375 g of distilled water, 115 g of N-vinylpyrrolidone, 2.6 g of N,N'-divinylethyleneurea and 0.05 g of sodium hydroxide were initially taken in a stirred apparatus and heated to 60° C. while stirring at a speed of 60 rpm. Nitrogen flowed through the solution from the beginning of heating-up to the end of the polymerization. The nitrogen was passed into the reaction mixture with the aid of a tube which ended at the bottom of the stirred apparatus. The flow rate of the nitrogen was 18 l/h. After the temperature of the reaction mixture had reached 60° C., 260 mg of sodium dithionite were added. The mixture was kept at 60° C. and stirred continuously. The popcorn polymerization began after about 20 minutes and was complete after about 5 hours. The viscous suspension was filtered and the residue was washed with water (about 2000 ml) in order to remove impurities such as soluble polymer and residual monomers. The yield of popcorn polymer was 98%.

Sieve Analysis:

| Particle size [μm] | Fraction [%] |
|---|---|
| >500 | 0 |
| 250–500 | 23.3 |
| <250 | 76.7 |

Example 5

1375 g of distilled water, 115 g of N-vinylpyrrolidone, 2.6 g of N,N'-divinylethyleneurea and 0.05 g of sodium hydroxide were initially taken in a stirred apparatus and heated to 60° C. while stirring at a speed of 60 rpm. Nitrogen was passed into the reaction mixture at the bottom of the stirred apparatus and flowed through the solution. The flow rate was 6 l/h. After the temperature of the reaction mixture had reached 60° C., 260 mg of sodium dithionite were added. The mixture was kept at 60° C. and stirred continuously. The popcorn polymerization began after about 20 minutes and was complete after about 7 hours. The viscous suspension was filtered and the residue was washed with water (about 2000 ml) in order to remove impurities such as soluble polymer and residual monomers. The yield of popcorn polymer was 93%.

Sieve Analysis:

| Particle size [μm] | Fraction [%] |
|---|---|
| >500 | 82.6 |
| 250–500 | 16.3 |
| <250 | 10.4 |

Example 6

1375 kg of distilled water, 115 kg of N-vinylpyrrolidone, 2.6 kg of N,N'-divinylethyleneurea and 1 kg of 5% strength sodium hydroxide solution were initially taken in a stirred kettle and heated to 75° C. while stirring at a rate of 60 rpm, nitrogen, which was passed into the reaction mixture at the bottom of the polymerization vessel, flowing through the solution during the heating-up and the polymerization. The flow rate was 350 l/h. After the temperature of the reaction mixture had increased to 75° C., 26 g of sodium dithionite, dissolved in 30 ml of water, were added. The mixture was kept at 75° C. and stirred continuously. The popcorn polymerization began after about 20 minutes and was complete after 6 hours. The viscous suspension was then filtered and the residue was washed with water in order to remove impurities such as soluble polymer and unpolymerized monomers. The yield of popcorn polymer was 94%.

TABLE 1

| | Sodium dithionite | | Sieve analysis | | |
|---|---|---|---|---|---|
| Example | [mg] | $N_2$ [l/h] | >500 [μm] | 250–500 [μm] | <250 [μm] |
| 1 | 130 | 6 | 72.0 | 13.6 | 14.4 |
| 2 | 26 | 18 | 79.1 | 15.3 | 5.6 |
| 3 | 26 | 6 | 94.8 | 13.0 | 9.2 |
| 4 | 260 | 18 | 0 | 23.3 | 76.7 |
| 5 | 260 | 6 | 82.5 | 16.3 | 10.4 |
| 6 | 26 g | 350 | 88.2 | 10.2 | 1.6 |

As shown by Examples 1 to 6, an unexpected increase in the polymerization rate is obtained according to the invention compared with the procedure of Comparative Example 1 (no nitrogen passed into the reaction mixture).

To demonstrate the mode of action of popcorn polymers as disintegration accelerators for detergent tablets, detergent tablets weighing about 4 g and having a diameter of 2.5 cm were produced from the detergent formulation A stated below and the popcorn polymers stated in Table 2. Tabletting was carried out in an eccentric press (from Korsch, type EK 0 DMS). The mixtures contained, as a disintegrant which was mixed with the pulverulent granulated detergent powder, the amounts of popcorn polymer which are stated in the table.

A disintegration tester from Erweka was used for determining the solubility. For this purpose, the tablets were agitated in a disintegration test basket with sieve base in a thermostatted water bath (30 upward and downward movements per minute over a height of 20 mm per movement). The time after which residue was no longer present on the sieve base was determined. The results are shown in the table.

| Detergent of composition A (all data in % by weight) | | |
|---|---|---|
| Alkylbenzenesulfonate | 8 | |
| Potassium coconut oil soap | 1.2 | |
| Nonionic surfactant | 6 | (1 mol of $C_{13}/C_{15}$-fatty alcohol, reacted with 7 mol of ethylene oxide) |
| Zeolite A | 35 | |
| Sodium carbonate | 8 | |
| Sodium metasilicate.5.5 $H_2O$ | 6 | |
| Sodium citrate | 4 | |
| Sodium percarbonate | 18 | |
| Tetraacetylethylenediamine (TAED) | 5 | |
| Complexing agent | 0.3 | (Ethylenediaminetetramethylene phosphonate) |
| 70:30 acrylic acid/ maleic acid copolymer, molar mass 70,000 | 4 | |
| Sodium sulfate | 3 | |
| Other constituents | 2.5 | (fragrances, antifoams, enzymes, optical brighteners) |
| Bulk density about 770 g/l | | |
| Particle size about 700–1000 μm | | |

TABLE 2

| Example | Detergent A | Mean particle size [μm] | Compression force kN | Tabletting pressure MPa | Dissolution time |
|---|---|---|---|---|---|
| (a) | 2% Polymer A[1] | 600 | 8.6 | 14.5 | <30 sec. |
| (b) | 1.5% Polymer A | >400 | | 14.5 | <30 sec. |

TABLE 2-continued

| Example | Detergent A | Mean particle size [μm] | Compression force kN | Tabletting pressure MPa | Dissolution time |
|---|---|---|---|---|---|
| (c) | Without polymer | | 4.09 | 13 | 30 min |
| (d) | Polymer B[2] | <100 | 5.98 | | 15 min |

[1] Prepared according to Example 6
[2] Commercial popcorn polymer based on polyvinylpyrrolidone

We claim:

1. A process comprising,
polymerizing a reaction mixture comprising at least one monoethylenically unsaturated monomer and a crosslinking agent in the absence of oxygen and polymerization inhibitors, while
passing an inert gas stream into the reaction mixture to form one or more popcorn polymers having a particle size in a range narrower and within the range of from 1 μm to 10 mm,
controlling the amount of the inert gas stream passed into the reaction mixture in order to obtain said polymers having a particle size in said narrower range,
wherein said polymerizing is a precipitation polymerization in water or in the absence of a solvent at a temperature of up to 200° C.

2. The process as claimed in claim 1, wherein the amount of inert gas passed into the reaction mixture is from 0.01 to 100 l of inert gas per hour per l of the reaction mixture.

3. The process as claimed in claim 1, wherein the polymerization is carried out in the presence of a reducing agent.

4. The process as claimed in claim 3, further comprising adding the reducing agent to the reaction mixture after beginning passing the inert gas.

5. The process as claimed in claim 1, wherein the inert gas is nitrogen.

6. The process as claimed in claim 1, wherein the monoethylenically unsaturated monomers are N-vinyllactams.

7. The process as claimed in claim 1, wherein the monomers are selected from the group consisting of N-vinylpyrrolidone, N-vinylpiperidone, N-vinylcaprolactam and mixtures thereof.

8. The process as claimed in claim 1, wherein the crosslinking agent is N, N'-divinylethyleneurea.

9. A popcorn polymer produced by the process as claimed in claim 1, wherein the popcorn polymer has a mean particle diameter of from greater than 400 μm to 1500 μm.

10. A composition comprising from 0.5 to 20% by weight of the popcorn polymer claimed in claim 9, wherein the popcorn polymer has a mean particle diameter of from 420 μm to 1000 μm.

11. A method of clarifying a beverage comprising,
bringing into contact the beverage with a popcorn polymer produced by the process claimed in claim 1,
wherein the popcorn polymer has a mean particle diameter of from 420 μm to 1000 μm.

12. An antidiarrheal drug comprising popcorn polymer produced by the process as claimed in claim 1, wherein the popcorn polymer has a mean particle diameter of from greater than 400 μm to 1500 μm.

13. A tablet comprising a popcorn polymer produced by the process as claimed in claim 1, wherein the popcorn polymer has a mean particle diameter of from greater than 400 μm to 1500 μm, wherein the popcorn polymer is capable of accelerating the disintegration of the tablet.

14. A detergent tablet comprising from 0.5 to 20% by weight of a popcorn polymer produced by the process as claimed in claim 1, wherein the popcorn polymer has a mean particle diameter of from greater than 400 μm to 1500 μm and wherein the popcorn polymer is capable of increasing the disintegration rate of the tablet when mixed with water.

* * * * *